「12」 United States Patent
Akkary et al.

(10) Patent No.: US 8,683,143 B2
(45) Date of Patent: Mar. 25, 2014

(54) UNBOUNDED TRANSACTIONAL MEMORY SYSTEMS

(75) Inventors: Haitham H. Akkary, Portland, OR (US); Ali-Reza Adl-tabatabai, Santa Clara, CA (US); Bratin Saha, San Jose, CA (US); Ravi Rajwar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 11/323,724

(22) Filed: Dec. 30, 2005

(65) Prior Publication Data

US 2007/0156994 A1 Jul. 5, 2007

(51) Int. Cl.
*G06F 12/08* (2006.01)

(52) U.S. Cl.
USPC .......................................... 711/145; 711/141

(58) Field of Classification Search
None
See application file for complete search history.

(56) References Cited

U.S. PATENT DOCUMENTS

| | | | |
|---|---|---|---|
| 5,428,761 A | 6/1995 | Herlihy et al. | |
| 5,652,859 A | 7/1997 | Mulla et al. | |
| 5,765,208 A | 6/1998 | Nelson et al. | |
| 5,835,961 A * | 11/1998 | Harvey et al. | 711/206 |
| 6,038,645 A | 3/2000 | Nanda et al. | |
| 6,640,285 B1 | 10/2003 | Bopardikar et al. | |
| 6,681,293 B1 | 1/2004 | Solomon et al. | |
| 6,877,088 B2 | 4/2005 | Dice | |
| 6,895,527 B1 * | 5/2005 | Quach et al. | 714/5 |
| 7,216,202 B1 * | 5/2007 | Chaudhry et al. | 711/122 |
| 7,263,585 B2 | 8/2007 | Hooker | |
| 7,395,382 B1 | 7/2008 | Moir | |
| 7,502,897 B2 | 3/2009 | Hertzberg et al. | |
| 7,542,977 B2 | 6/2009 | Hudson et al. | |
| 2002/0108025 A1 | 8/2002 | Shaylor | |
| 2003/0033510 A1 | 2/2003 | Dice | |
| 2004/0015642 A1 | 1/2004 | Moir et al. | |
| 2004/0034673 A1 | 2/2004 | Moir et al. | |
| 2004/0068618 A1 * | 4/2004 | Hooker | 711/141 |
| 2005/0235067 A1 | 10/2005 | Creta et al. | |
| 2006/0085591 A1 | 4/2006 | Kumar et al. | |
| 2006/0161740 A1 * | 7/2006 | Kottapalli et al. | 711/152 |
| 2006/0184840 A1 | 8/2006 | Floyd et al. | |
| 2006/0259589 A1 | 11/2006 | Lerman et al. | |
| 2006/0265557 A1 * | 11/2006 | Peinado et al. | 711/154 |
| 2006/0294326 A1 * | 12/2006 | Jacobson et al. | 711/156 |
| 2007/0043915 A1 * | 2/2007 | Moir et al. | 711/141 |
| 2007/0143287 A1 | 6/2007 | Adl-tabatabai et al. | |

(Continued)

FOREIGN PATENT DOCUMENTS

| | | |
|---|---|---|
| WO | 2007078538 A3 | 7/2007 |
| WO | 2007078571 A1 | 7/2007 |
| WO | WO-2007078883 A1 | 7/2007 |

OTHER PUBLICATIONS

Andrew S. Tanenbaum (Structured computer organization, pub. by Prentice-Hall, Inc., 1984), pp. 10-12.*

(Continued)

*Primary Examiner* — Kaushikkumar Patel
(74) *Attorney, Agent, or Firm* — Blakely, Sokoloff, Taylor & Zafman LLP

(57) ABSTRACT

Methods and apparatus to provide unbounded transactional memory systems are described. In one embodiment, an operation corresponding to a software transactional memory (STM) access may be executed if a preceding hardware transactional memory (HTM) access operation fails.

34 Claims, 7 Drawing Sheets

(56) References Cited

U.S. PATENT DOCUMENTS

| | | | |
|---|---|---|---|
| 2007/0156780 A1 | 7/2007 | Saha et al. | |
| 2007/0162520 A1 | 7/2007 | Petersen et al. | |
| 2007/0186056 A1 | 8/2007 | Saha et al. | |
| 2007/0239797 A1 | 10/2007 | Cattell et al. | |
| 2007/0239942 A1 | 10/2007 | Rajwar et al. | |
| 2007/0260942 A1 | 11/2007 | Rajwar et al. | |
| 2007/0283108 A1* | 12/2007 | Isherwood et al. | 711/154 |
| 2008/0270745 A1 | 10/2008 | Saha et al. | |

OTHER PUBLICATIONS

Moir, M. "Hybrid Transactional Memory", *Annoucement Sun Microsystems*, (Jul. 2005), pp. 1-15.

Moir, M. "Hybrid Hardware/ Software Transactional Memory", Internet Citation, (2005), 23 pages.

Lie, S. "Hardware Support for Unbounded Transactional Memory", *Master's Thesis, Masscchusetts Institute of Technology Department of Electrical Engineering and Computer Science.*, (May 7, 2004), pp. 85-102.

Chang, A. et al., "Architecture and Programming", *ACM Transactions on Computer Systems*, 6(1), (Feb. 1, 1988), pp. 28-52.

Lev, Y. et al., "Towards a Safer Interaction with Transactional Memory By Tracking Object Visibility", *Proceedings of synchronization and Concurrency in Object-Oriented Languages*, (Oct. 7, 2005), pp. 31-38.

Ananian, C. S., et al., "Unbounded Transactional Memory In: High Performance Computer Architecture", *11th International Symposium*, Edited by IEEE Computer Society, (2005), pp. 316-327.

*International Search Report and Written Opinion for application No. PCT/US2007/064450*, 12 pages.

*International Search Report and Written Opinion for Application No. PCT/US2006/048041*, (Jun. 12, 2007), 12 pages.

Ananian, C S., et al., "Unbounded Transactional Memory", *MIT Computer Science and Artificial Intelligence Laboratory*, 12 pages.

Harris, Tim , et al., "Language Support for Lightweight Transactions", *ACM*, OOPSLA, (Oct. 2003), 15 pages.

Herlihy, Maurice , et al., "Transactional Memory: Architectural Support for Lock-Free Data Structures", 12 pages.

Rajwar, Ravi , et al., "Virtualizing Transactional Memory", 12 pages.

Ennals, R "Software Transactional Memory Should Not be Obstruction-Free", http://www.cambridge.intel-research.net/-ennals/notlockfree.pdf, [online]. [Retrieved Sep. 14, 2005], (Sep. 14, 2005).

Harris, T. et al., "Language Support for Lightweight Transactions", *Proceedings of the 18th annual ACM SIGPLAN Conference on Object-oriented Programming, Systems, Languages, and Applications.*, (Oct. 2003), pp. 388-402.

Herlihy, M. et al., "Transactional Memory: Architectural Support for Lock-Free Data Structures", *Proceedings of the 10th annual International Symposium on Computer Architecture.*, (1993), pp. 289-300.

Company, Hewlett-Packard Development "Memory-Relevant Portions of the Processor", *Retrieved from the Internet at* <URL: http://docs.hp.com/cgi-binipf-new.cgi?IN=/en/5965-4641/chOI_s05.html&printable=I>., [online] [Retrieved on Sep. 18, 2005], (Sep. 18, 2005).

Lie, S. et al., "An Integrated Hardware-Software Approach to Transactional Memory", *MIT Computer Science and Artificial Intelligence Laboratory.*, [Abstract], (Feb. 2004), pp. 1-2.

Lie, S. "An Integrated Hardware-Software Approach to Transactional Memory", *6.895 Theory of Parallel Systems*, [Paper], pp. 1-18.

Lie, S. "An Integrated Hardware-Software Approach to Transactional Memory", *6.895 Theory of Parallel Systems*, [Presentation], (Dec. 8, 2003).

Rajwar, R et al., "Virtualizing Transactional Memory", *ACM SIGARCH Computer Architecture News*, vol. 33, Issue 2., (May 2005), pp. 494-505.

Stenstrom, P "A Survey of Cache Coherence Schemes for Multiprocessors", *Computer*, vol. 23, Issue 6, (Jun. 1990), pp. 12-24.

Lev, Y et al., "Towards a Safer Intercation with Transactional Memory by Tracking Object Visibility", *Proceedings of Synchronization and Concurrency in Object-Oriented Languages (SCOOL)*, [XP-002432120], (Oct. 7, 2005), pp. 31-38.

Moir, M "Hybrid Hardware/Software Transactional Memory", *Sun Microsystems*, [XP002407376], (Apr. 8, 2005), 21 pp.

"PCT International Search Report and Written Opinion", *International Application No. PCT/US2006/046499*, (Jun. 12, 2007), 11 pp.

Stonebraker, M "Virtual Memory Transaction Managment", *Operating Systems Review USA*, vol. 18, No. 2., [XP-002434839], (Apr. 1984), pp. 8-16.

Sukha, J "Memory-Mapped Transactions", *Master's Thesis, Massachusetts Institute of Technology Department of Electrical Engineering and Computer Science.*, [XP-002434529], (Jun. 2005), 154 pp.

Lerman, D. R., et al., "Apparatus and Methods for Posting and Streaming Videos", U.S. Appl. No. 60/673,445, (Apr. 2005).

Damron, Peter, et al., "Hybrid Transactional Memory", Sun Microsystems, ASPLOS'06, Oct. 21-25, 2006, San Jose, California.

International Preliminary Report on Patentability Received for PCT Application No. PCT/US2006/048041, mailed on Jul. 10, 2008, 8 pages.

Office Action Received for G.B. Patent Application No. 0809450.0, mailed on Nov. 11, 2008, 4 pages.

Office Action Received for Korean Patent Application No. 10-2008-7015791, mailed on Jun. 24, 2009, 18 pages.

Non-Final Office Action Received for U.S. Appl. No. 11/394,622, mailed on Aug. 14, 2009, 19 pages.

Final Office Action Received for U.S. Appl. No. 11/394,622, mailed on Dec. 29, 2008, 17 pages.

Non-Final Office Action Received for U.S. Appl. No. 11/394,622, mailed on May 28, 2008, 18 Pages.

Non-Final Office Action Received for U.S. Appl. No. 11/394,687, mailed on Aug. 12, 2009, 16 Pages.

Final Office Action Received for U.S. Appl. No. 11/394,687, mailed on Jan. 16, 2009, 16 Pages.

Non-Final Office Action Received for U.S. Appl. No. 11/394,687, mailed on Jun. 25, 2008, 17 Pages.

Non-Final Office Action Received for U.S. Appl. No. 11/303,529, mailed on Feb. 9, 2009, 15 Pages.

Office Action Received for U.S. Appl. No. 11/303,529, mailed on Aug. 19, 2008, 11 Pages.

Office Action Received for Chinese Patent Application No. 200710126654.9, mailed on Aug. 29, 2008, 5 pages of Office Action and 3 pages of English Translation.

Office Action Received for U.S. Appl. No. 11/303,529, mailed on Nov. 16, 2009, 17 pages.

Office Action Received for German Patent Application No. 11 2006 003 597.5, mailed on Feb. 8, 2010, 3 pages of Office Action and 3 pages of English Translation.

Office Action Received for Chinese Patent Application No. 200680045097.1, mailed on Mar. 1, 2010, 7 pages of Office Action and 8 pages of English Translation.

Office Action Received for Chinese Patent Application No. 200710126654.9, mailed on May 12, 2010, 8 pages of English Translation.

Office Action Received for U.S. Appl. No. 11/394,687, mailed on May 10, 2010, 15 pages.

Notice of Allowance Received for U.S. Appl. No. 11/303,529, mailed on Jun. 2, 2010, 8 pages.

Office Action Received for U.S. Appl. No. 11/394,622, mailed on Apr. 14, 2010, 17 pages.

Office Action Received for Chinese Patent Application No. 200680045097.1, mailed on Sep. 14, 2010, 11 pages of English Translation and 9 pages of Office Action.

International Preliminary Report on Patentability Received for PCT Application No. PCT/US2006/046499, 7 pages.

Office Action Received for Taiwanese Patent Application No. 096111333, mailed on Sep. 1, 2010, 1 page of English Translation and 9 pages of Office Action.

Office Action Received for U.S. Appl. No. 11/394,622, mailed on Dec. 3, 2010, 16 pages.

* cited by examiner

UNBOUNDED TRANSACTIONAL MEMORY SYSTEMS

BACKGROUND

The present disclosure generally relates to the field of electronics. More particularly, an embodiment of the invention relates to unbounded transactional memory systems.

To improve performance, some computer systems may execute multiple threads concurrently. Generally, before a thread accesses a shared resource, it may acquire a lock of the shared resource. In situations where the shared resource is a data structure stored in memory, all threads that are attempting to access the same resource may serialize the execution of their operations in light of mutual exclusivity provided by the locking mechanism. This can be detrimental to system performance and may cause program failures, e.g., due to deadlock bugs.

To reduce performance hits resulting from utilization of locking mechanisms, some computer systems may use transactional memory. Transactional memory generally refers to a synchronization model that allows multiple threads to concurrently access a shared resource (such as a data structure stored in memory) without acquiring a lock as long as the accesses are non-conflicting, for example, as long as the accesses are directed to different portions of the shared resource.

Transactional memory may be implemented through a table lookup mechanism. In particular, to access a shared resource, a thread may first check a table stored in memory to determine whether another thread is accessing the same portion of the shared resource. Accessing a table that is stored in memory may generate overhead that decreases performance.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Figure 1:
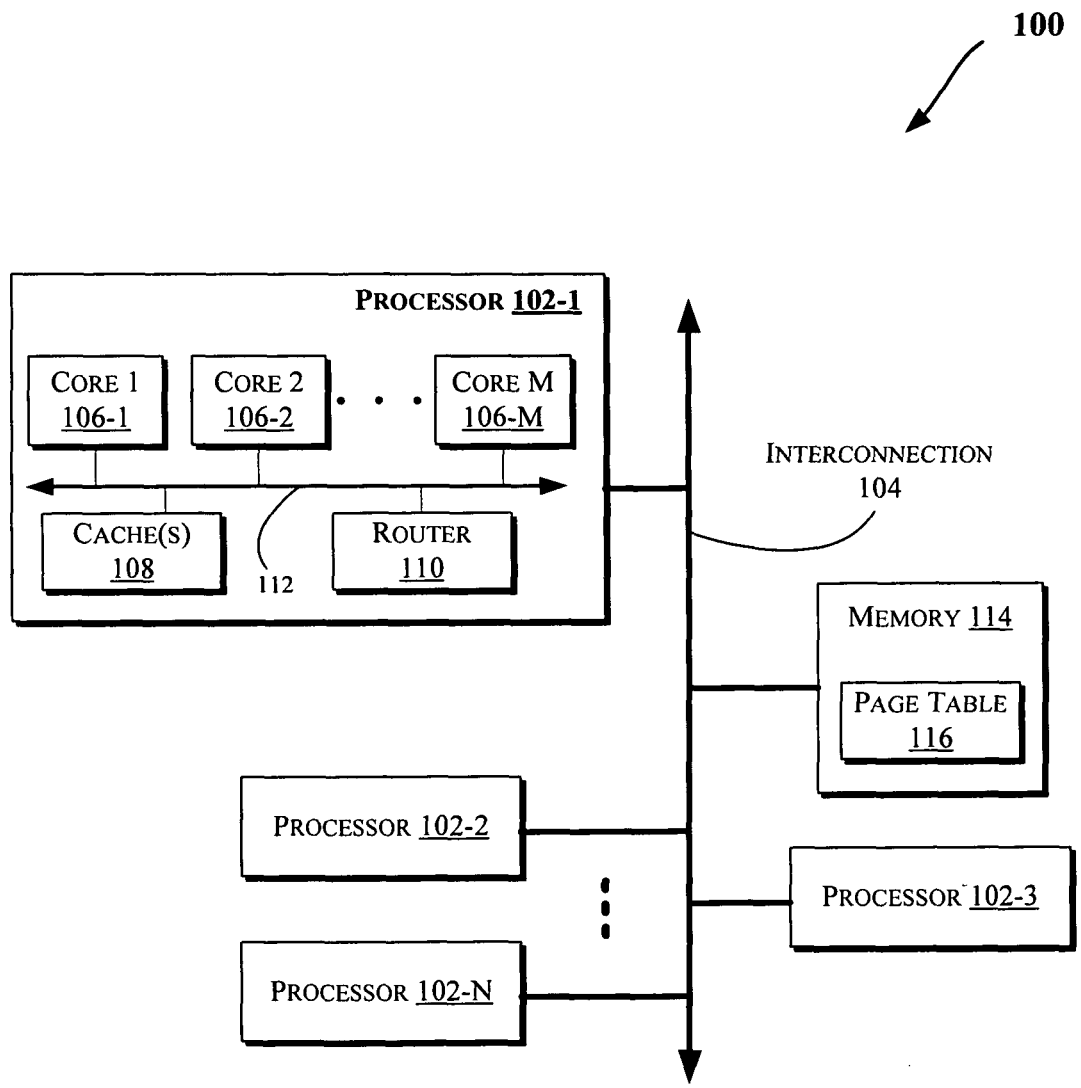
FIGS. 1, 6, and 7 illustrate block diagrams of embodiments of computing systems, which may be utilized to implement various embodiments discussed herein.

Some of the embodiments discussed herein may provide efficient mechanisms for unbounded transactional memory systems that utilize a combination of hardware transactional memory (HTM) and software transactional memory (STM) techniques, such as the embodiments discussed with reference to computing systems of FIGS. 1-7. More particularly, FIG. 1 illustrates a block diagram of a computing system 100, according to an embodiment of the invention. The system 100 may include one or more processors 102-1 through 102-N (referred to herein as "processors 102" or more generally "processor 102"). The processors 102 may communicate via an interconnection or bus 104. Each of the processors may include various components some of which are only discussed with reference to processor 102-1 for clarity. Accordingly, each of the remaining processors 102-2 through 102-N may include the same or similar components discussed with reference to the processor 102-1. Additionally, the embodiments discussed herein are not limited to multiprocessor computing systems and may be applied in a single-processor computing system.

In an embodiment, the processor 102-1 may include one or more processor cores 106-1 through 106-M (referred to herein as "cores 106" or more generally as "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus 112), memory controllers (such as those discussed with reference to FIGS. 6 and 7), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

Additionally, the cache 108 may store data (e.g., including instructions) that are utilized by one or more components of the processor 102-1. For example, the cache 108 may locally cache data stored in a memory 114 for faster access by components of the processor 102-1. As shown in FIG. 1, the memory 114 may be in communication with the processors 102-1 via the interconnection 104. In an embodiment, the cache 108 (that may be shared) may include one or more of a level 2 (L2) cache, a last level cache (LLC), or other types of cache. Also, each of the cores 106 or processors 102 may include a level 1 (L1) cache. Various components of the processor 102-1 may communicate with the cache 108 directly, through a bus (e.g., the bus 112), and/or a memory controller or hub. Also, the processor 102-1 may include more than one cache. As will be further discussed with reference to FIG. 2, the memory 114 may also include a page table 116 that stores information regarding the mapping between virtual and physical addresses.

Figure 2:
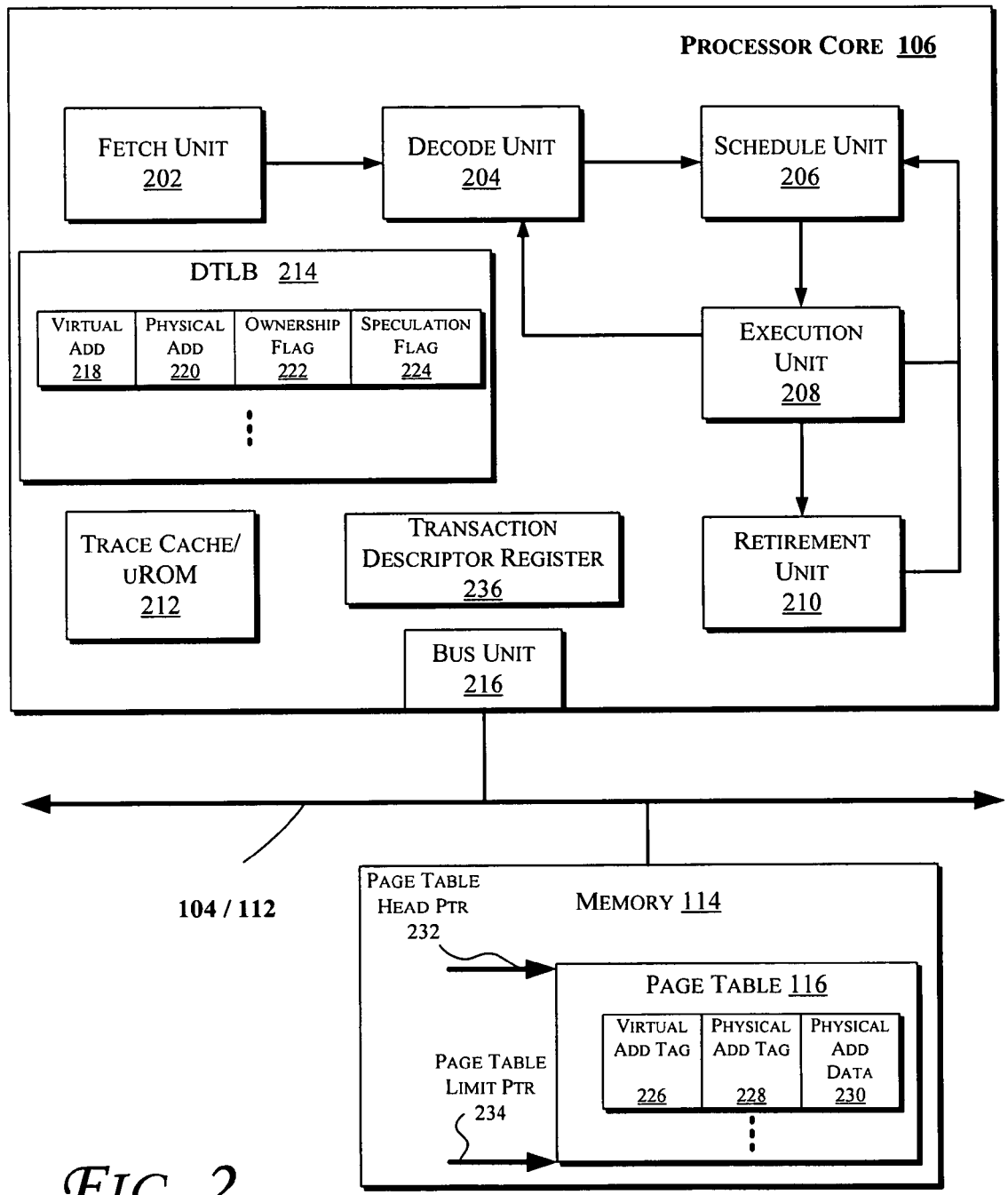
FIG. 2 illustrates a block diagram of portions of a processor core, according to an embodiment of the invention.

FIG. 2 illustrates a block diagram of portions of a processor core 106, according to an embodiment of the invention. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 6 and 7. The core 106 may also include a decode unit 204 to decode the fetched instruction. For instance, the decode unit 204 may decode the fetched instruction into a plurality of uops (micro-operations).

Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as a memory execution unit, an integer execution unit, a floating-point execution unit, or other execution units. Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

As illustrated in FIG. 2, the core 106 may additionally include a trace cache or microcode read-only memory (uROM) 212 to store microcode and/or traces of instructions that have been fetched (e.g., by the fetch unit 202). The microcode stored in the uROM 212 may be used to configure various hardware components of the core 106. In an embodiment, the microcode stored in the uROM 212 may be loaded from another component in communication with the processor core 106, such as a computer-readable medium or other storage device discussed with reference to FIGS. 6 and 7.

The processor core 106 may also include a data translation look-a-side buffer (DTLB) 214 to store (or cache) portions of the page table 116. In one embodiment, the DTLB 214 may be a content addressable memory (CAM). Furthermore, the processor core 106 may include a bus unit 216 to allow communication between components of the processor core 106 and other components (such as the components discussed with reference to FIG. 1) via one or more buses (e.g., buses 104 and/or 112). The page table 116 and the DTLB 214 may include one or more entries. In one embodiment, for each entry, the DTLB 214 may store information such a virtual address 218 (e.g., that may identify a memory address virtually), a physical address 220 (e.g., which may identify a physical address in the memory 114, or another memory, that corresponds to the virtual address 218), an ownership flag 222 (e.g., that includes one or more bits to identify an owner, ownership status, and/or owner access type (e.g., read or write access) of the corresponding entry or a page within the DTLB 214), and/or a speculation flag 224 (e.g., which may be utilized by a thread or a memory transaction to indicate that the corresponding entry (or page) is being accessed speculatively). In an embodiment, the page table 116 may also include the fields 218-224 for each entry.

In one embodiment, for each entry, the page table 116 may store information such as a virtual address tag 226, a physical address tag 228, and/or physical address data 230. The tags 226 and 228 may be utilized to search the page table 116 (e.g., to obtain physical address data 230) as will be further discussed herein with reference to FIGS. 3-5.

In an embodiment, a page table base pointer 232 may point to the base of the page table 116. Additionally, a page table limit pointer 234 may point to the top (or last entry) of the page table 116. The pointers 232 and 234 may be stored in hardware registers, or as variables in a memory (such as the memory 114). The core 106 may also include a transaction descriptor register 236, e.g., to store a descriptor corresponding to one or more instructions of a transactional memory request. Further details regarding operations relating to the components discussed with reference to FIGS. 1-2 will be discussed with reference to the methods illustrated by FIGS. 3-5.

Figure 3:
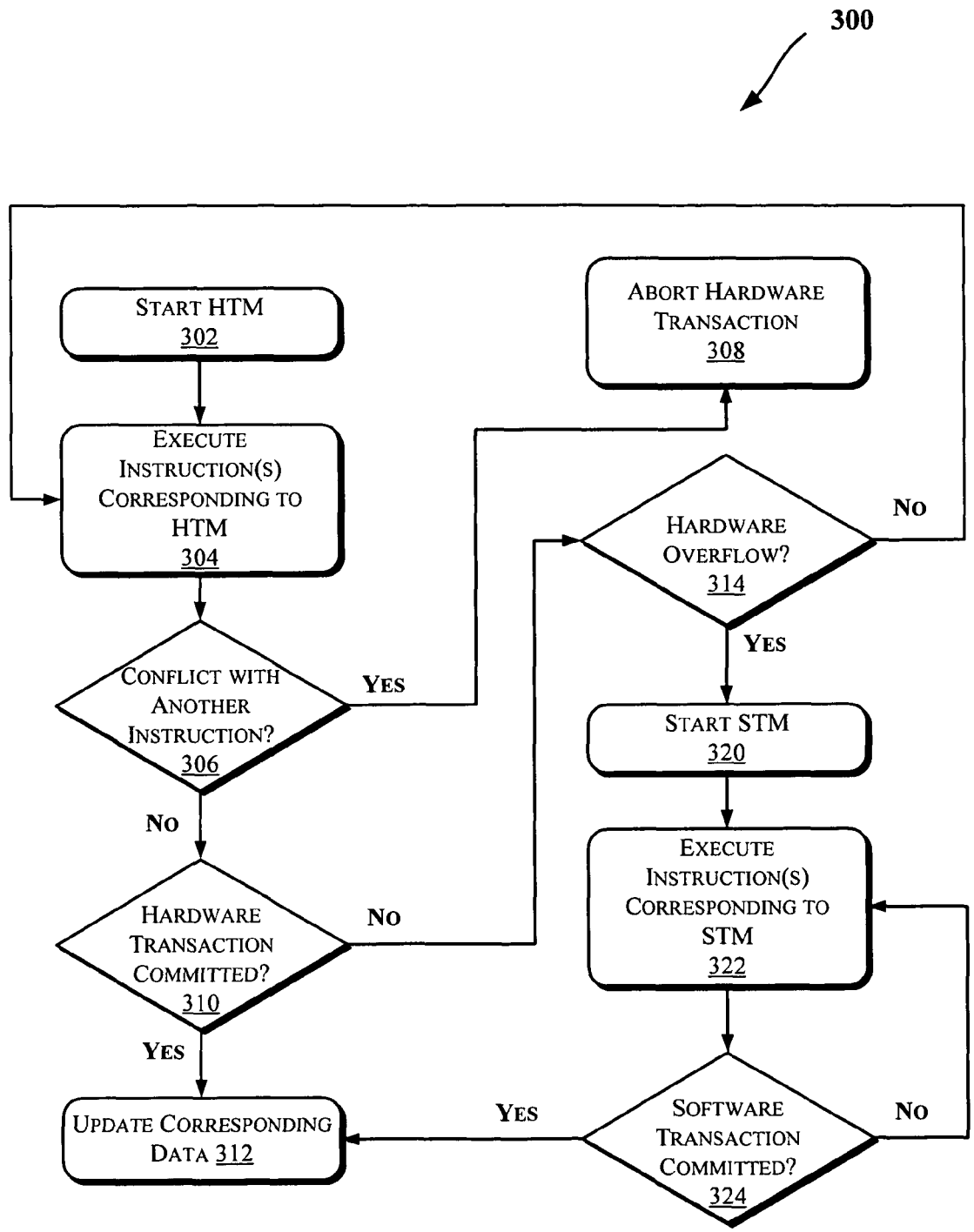
FIGS. 3-5 illustrate block diagrams of methods in accordance with various embodiments of the invention.

More specifically, FIG. 3 illustrates a block diagram of an embodiment of a method 300 to execute one or more instructions corresponding to HTM and/or STM transactions. In an embodiment, various components discussed with reference to FIGS. 1-2 and 6-7 may be utilized to perform one or more of the operations discussed with reference to FIG. 3.

Referring to FIGS. 1-3, at an operation 302, a thread that is being executed by the core 106 may start an HTM transaction. The thread may include one or more instructions that are executed by the core 106 (304). Hence, the thread may include one or more instructions that correspond to an HTM access request (such as one or more load or store operations). At an operation 306, if there is a conflict with another instruction (which may be an instruction corresponding to the same thread or another thread, e.g., running on a difference processor core), the hardware transaction is aborted at an operation 308. For example, a conflicting instruction may send a snoop for an entry in the DTLB 214 that the HTM transaction of operation 302 is accessing (or has marked as being accessed, as indicated by a value stored in the speculation flag 224).

If no conflicts arise at operation 306, at an operation 312, the core 106 may determine whether the hardware transaction corresponding to the HTM of operation 302 has been committed (e.g., by the retirement unit 210) at an operation 310. If the hardware transaction is committed, the core 106 may update the corresponding data in the memory 114, page table 116, and/or DTLB 214. Otherwise, if the hardware transaction (or one of its instructions) fails to commit at operation 310, the core 106 may determine whether the failure to commit is due to a hardware overflow (314), e.g., due to cache overflow, an exceptional condition, an interrupt, an exception, a page fault, an input/output instruction, or other hardware overflow conditions. If no hardware overflow occurs (314), the core 106 may continue with the operation 304, e.g., to execute the remaining instructions corresponding to the HTM transaction of the operation 302. In case of a hardware overflow (314), the core 106 may start an STM transaction at operation 320. In an embodiment, The HTM of operation 302 and the STM of operation 320 may be directed at the same access (e.g., one or more read or write operations) to the memory 114. Thus, in one embodiment, once the HTM of operation 302 fails to commit due to a hardware overflow at operation 422, the same memory operation(s) may be performed by the STM of operation 320. At an operation 322, the core 106 may execute one or more instructions corresponding to the STM. Hence, the thread may include one or more instructions that correspond to an STM access request (such as one or more load or store operations). At an operation 324, the core 106 may determine whether the STM transaction has been successfully committed. If STM transaction remains to be committed (324), the core 106 may continue executing the remaining instructions corresponding to the STM transaction of the operation 320. If the software transaction is committed (324), at the operation 312, the core 106 may update the corresponding data in the memory 114, page table 116, and/or DTLB 214. In an embodiment, operation 312 may be performed atomically, e.g., such that after commit (at operations 310 and/or 324), the speculative updates become visible atomically.

In one embodiment, the core 106 may execute the instructions discussed with reference to the method 300 speculatively, as will be further discussed with reference to FIGS. 4 and 5. For example, at the operations 302 and/or 320, the core 106 may store a value in the speculation flag 224 to indicate that the corresponding entry in the DTLB 214 and/or the page table 116 is accessed speculatively. Once the HTM aborts (at operation 308), or the HTM or STM transactions are successfully committed at operation 312, the core 106 may update the speculation flag 224 to indicate that the corresponding entry is no longer being accessed speculatively. In an embodiment, the conflict of the operation 306 may be caused by a snoop access to an entry that is marked by the HTM transaction of operation 302 as having been speculatively accessed (e.g., through the speculation flag 224). In accordance with at least one instruction set architecture, the snoop may be generated by a request for ownership (or "RFO") instruction. Accordingly, a processor core (106) may take exclusive ownership of a DTLB entry (214), e.g., to invalidate the corresponding entries in other DTLBs of other processor cores.

Furthermore, in an embodiment, DTLB shoot-downs may be used to maintain coherence of the DTLBs (214A) in a multi-core processor (e.g., processor 102-1). DTLB shoot-downs generally refer to situations where one thread makes change(s) to a page table (116) and, as a result, a signal is sent to other cores (106) to remove the corresponding entry from their respective DTLB (214). In one embodiment, fields 226-230 of the page table 116 may be utilized in addition to cache coherence protocols. For example, the DTLB 214 (and the page table 116) may be stored in an identifiable portion of the physical memory (e.g., with in the memory 114), such as the portion identified by the pointers 232 and 234. When the core 106 (or a snoop filter provided in the core 106) detects a snoop on the bus (104/112), it knows whether the snoop is intended for the DTLB 214 or the caches by referencing the fields 226-230 in the page table 116. In an embodiment, when a processor core 106 wants to take ownership of a DTLB 214 entry, it may send a snoop for the corresponding physical address which is then looked up in the page table 116 by using the physical address tag 226, and optionally the data stored in the physical address data field 230 may be provided.

Figure 4:
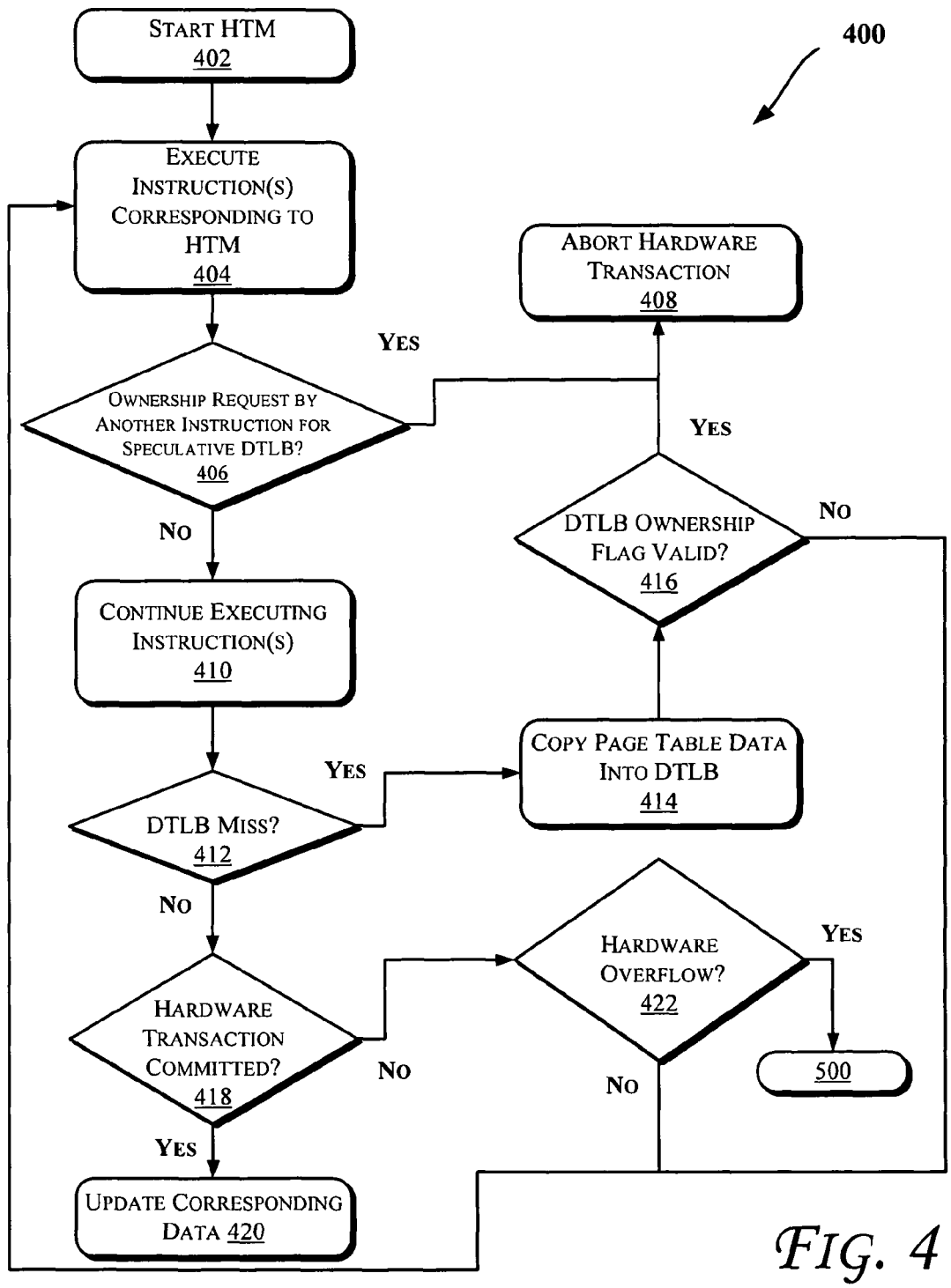

FIG. 4 illustrates a block diagram of an embodiment of a method 400 to execute one or more instructions corresponding to an HTM transaction. In one embodiment, FIG. 4 illustrates further details regarding some of the operations discussed with reference to the method 300 of FIG. 3. Additionally, various components discussed with reference to FIGS. 1-2 and 6-7 may be utilized to perform one or more of the operations discussed with reference to FIG. 4.

Referring to FIGS. 1-4, at operations 402 through 404, the core 106 may start an HTM transaction and execute one or more instructions corresponding to the HTM transaction, such as discussed with reference to operations 302 though 304, respectively. At an operation 406, the core 106 may determine if there is an ownership request for a DTLB entry that is being accessed speculatively, e.g., by another instruction, such as discussed with reference to operation 306. If there is an ownership request (406), the HTM transaction of operation 402 may be aborted. In one embodiment, after aborting the HTM transaction, control may be transferred to a user-level abort handler to determine whether to retry the same HTM transaction or take other action.

The core 106 continues executing one or more instructions corresponding to the HTM transaction at operation 410, if no ownership requests are received at the operation 406. At an operation 412, if there is a DTLB miss (such as when an entry corresponding to a virtual or physical address accessed by an instruction of HTM transaction is absent from the DTLB 214, e.g., due to a prior eviction of that entry), the corresponding data (e.g., a portion of the page table 116) may be copied from the page table 116 into the DTLB 214 at an operation 414. The information copied may include the corresponding virtual address 218, physical address 220, ownership flag 222, and/or speculation flag 224.

At an operation 416, the core 106 may determine whether the ownership flag 222 of the entry copied from the page table 116 at operation 414 indicates a valid ownership of the corresponding entry. If the ownership flag 222 indicates a valid value (e.g., a non-null value in an embodiment), the core 106 aborts the hardware transaction at the operation 408. Such as discussed with reference to FIG. 2, the ownership flag 222 may also include owner access type information (e.g., read or write access). In an embodiment, if one or more bits of the ownership flag 222 indicate that the owner is performing read access, the method 400 may continue at operation 402 (in part, because two instructions reading from the same entry of the DTLB 214 may not cause a conflict). Furthermore, if the ownership flag 222 indicates a non-valid value (e.g., a null value in an embodiment), the core 106 continues executing the remaining instructions corresponding to the HTM transaction of operation 402.

At an operation 418, the core 106 may determine whether the hardware transaction corresponding to the HTM of operation 402 has been committed (e.g., by the retirement unit 210). If the hardware transaction is committed, the core 106 may update the corresponding data in the memory 114, page table 116, and/or DTLB 214 (420). Otherwise, if the hardware transaction (or one of its instructions) fails to commit at operation 418, the core 106 may determine whether the failure to commit is due to a hardware overflow (422), e.g., due to cache overflow, an exceptional condition, an interrupt, an exception, a page fault, an input/output instruction, or other hardware overflow conditions. If no hardware overflow occurs (422), the core 106 may continue with the operation 404, e.g., to execute the remaining instructions corresponding to the HTM transaction of the operation 402. In case of a hardware overflow (422), the core 106 may start an STM transaction, as will be further discussed with reference to FIG. 5.

Figure 5:
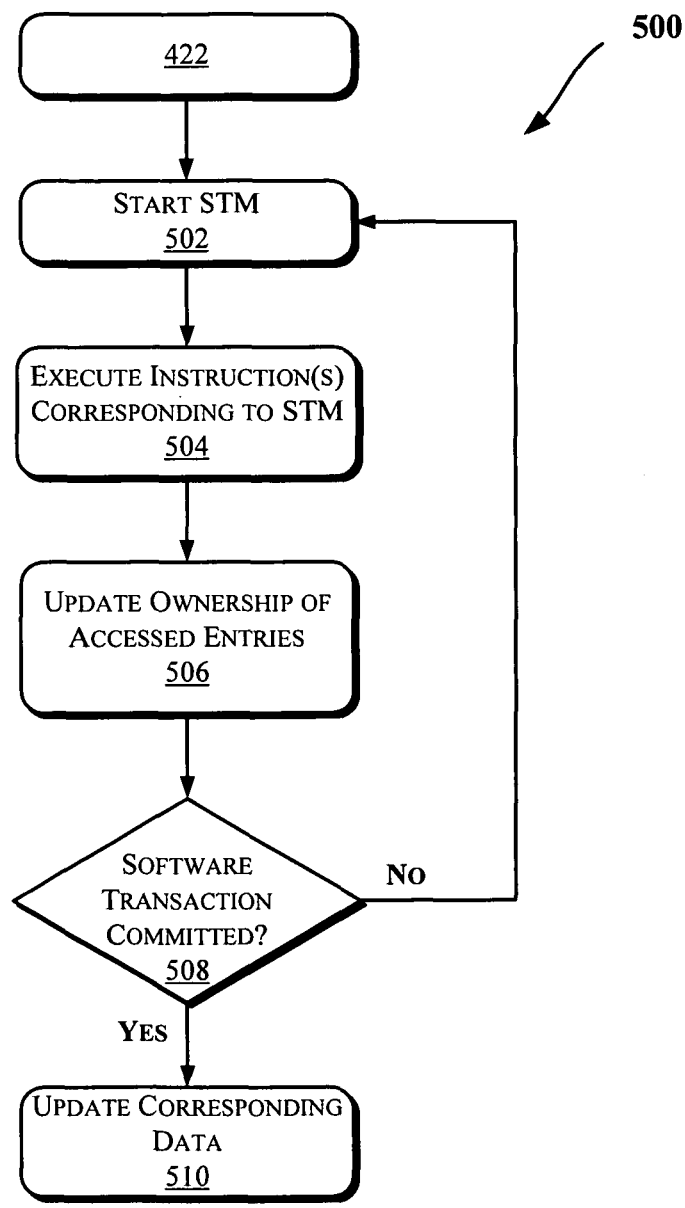

FIG. 5 illustrates a block diagram of an embodiment of a method 500 to execute one or more instructions corresponding to an STM transaction. In one embodiment, FIG. 4 illustrates further details regarding some of the operations discussed with reference to the method 300 of FIG. 3. Additionally, various components discussed with reference to FIGS. 1-2 and 6-7 may be utilized to perform one or more of the operations discussed with reference to FIG. 5.

Referring to FIGS. 1-5, at operations 502 through 504, the core 106 may start an STM transaction and execute one or more instructions corresponding to the STM transaction, such as discussed with reference to operations 320 though 322, respectively. At an operation 506, the core 106 may update the ownership flag 222 of any accessed entries of the DTLB 214 (e.g., due to the execution of an instruction at operation 504). As discussed with reference to FIG. 2, the ownership flag 222 may include one or more bits to identify an owner or ownership status of the corresponding entry. In one embodiment, at operation 502, the core 106 may store a value corresponding to the STM transaction (e.g., a transaction identifier) in the transaction descriptor register 236. Subsequently, at the operation 506, the core 106 may copy the value stored in the transaction descriptor register 236 to the ownership flag 222 of the corresponding entry.

At an operation 508, the core 106 may determine whether the STM transaction has been successfully committed. If STM transaction remains to be committed (508), the core 106 may continue executing the remaining instructions corresponding to the STM transaction of the operation 502. If the software transaction is committed (508), at an operation 510, the core 106 may update the corresponding data in the memory 114, page table 116, and/or DTLB 214. In an embodiment, operation 510 may be performed atomically, e.g., such that after commit (at operation 508), the speculative updates become visible atomically.

As discussed with reference to FIG. 3, the HTM (e.g., of operations 302 or 402) and the STM (e.g., of operations 320 or 502) may be directed at the same access (e.g., one or more read or write operations) to the memory 114. Moreover, in one embodiment, to implement the operations discussed with reference to FIGS. 3 through 5, a compiler may generate two copies of the following synchronized pseudo code block:

```
synchronized {
    load addr1;
    load addr2;
    store addr3;
}
```

The two compiled copies of the pseudo code may be as follows:
COPY #1 (HTM Code):

```
synchronized {
    load addr1;
    load addr2;
    store addr3;
}
```

COPY #2 (STM Code):

```
load Descriptor into register 236
DLoad1 addr1;
DLoad2 addr2;
DStore3 addr3;
STM_commit( );
}
```

Referring to the above pseudo codes and FIGS. 1-5, if the copy #1 fails to execute as a HTM, the second pseudo code (copy #2) may be executed as an STM (such as discussed with reference to FIGS. 3-5). Accordingly, the HTM code may execute the atomic region as an HTM transaction. In one embodiment, the HTM code may rely on cache coherence mechanisms for ensuring transaction consistency and may not take any ownership of page table (116) entries such as discussed with reference to FIGS. 3-5. If the HTM transaction fails to commit due to hardware overflow (422), the STM code (copy #2) may then be executed as an STM transaction.

As shown in the sample STM code above (copy #2), the program may first load a descriptor (or identifier) corresponding to the STM transaction (502) into the register 236. In accordance with at least one instruction set architecture, the program (copy #2) may then use the instructions "DLoad" and "DStore" for the load and store instructions, respectively. In one embodiment, the "DLoad" instruction may obtain exclusive ownership of a corresponding DTLB (214) entry, e.g., by copying the value of the register 236 into a portion of the corresponding ownership flag 222. In an embodiment, the "DStore" instruction may obtain exclusive ownership of a corresponding DTLB (214) entry, e.g., by copying the value of the register 236 into a portion of the corresponding ownership flag 222. The "STM_commit( )" instruction may test for a successful commitment of the STM code (508).

In accordance with at least one instruction set architecture, a "DRelease" instruction may be used to relinquish ownership of one or more entries (or pages) of the DTLB 214, for example, by updating the corresponding ownership flag 222 (e.g., by setting the flag to null). In one embodiment, all stores (e.g., discussed with reference to the STM code) are done into thread-private memory locations (e.g., with in the cache 108), while one or more instructions corresponding to the STM transaction are being executed (322). When the code reaches the end of the STM transaction and is able to commit successfully (324), the updates are copied into the corresponding locations such as discussed with reference to operation 312, 420, and/or 510. Accordingly, these operations may use the "DRelease" instruction to release ownership of all the pages the thread has accessed.

Figure 6:
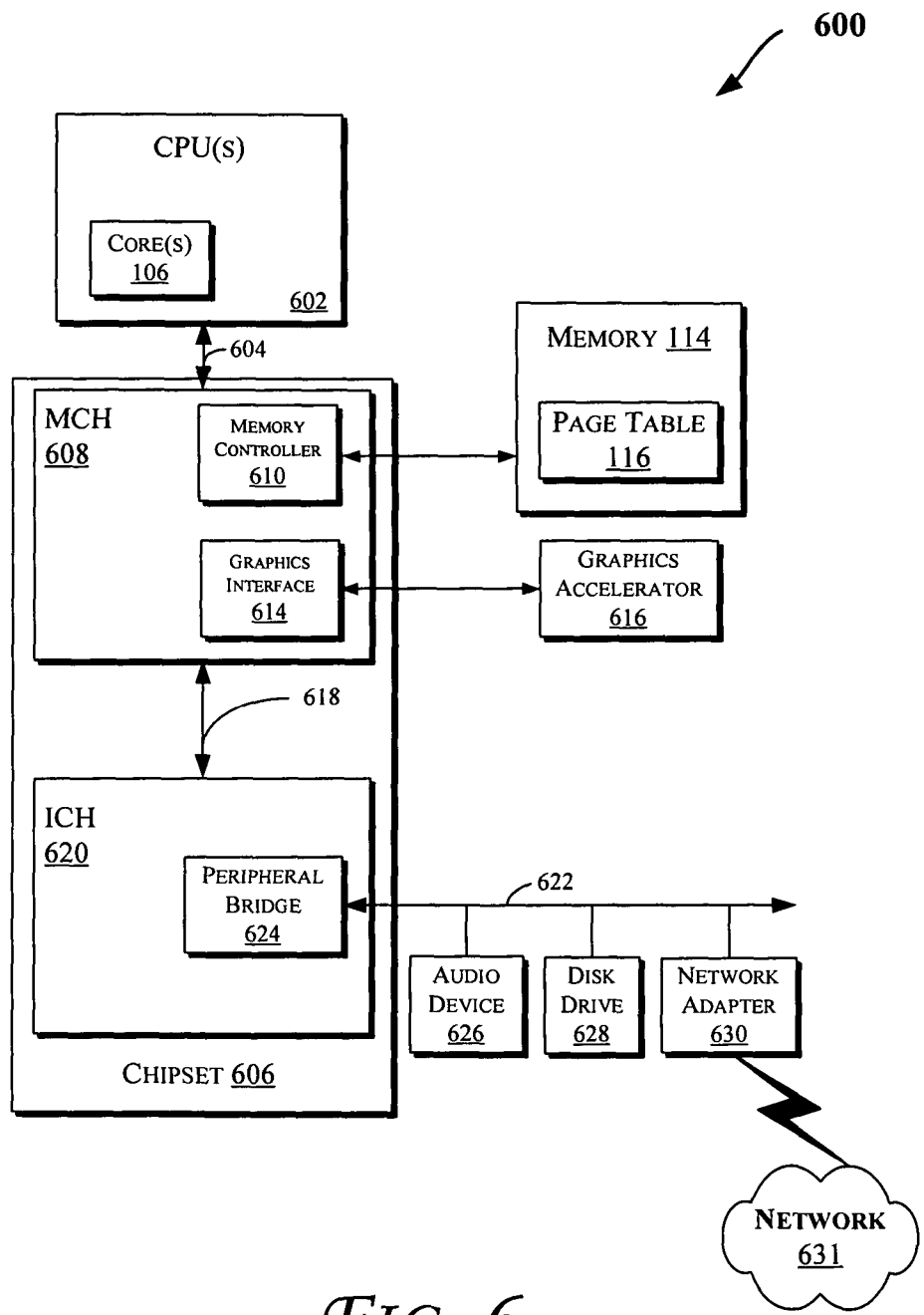

FIG. 6 illustrates a block diagram of an embodiment of a computing system 600. The computing system 600 may include one or more central processing unit(s) (CPUs) or processors 602 that communicate with an interconnection (or bus) 604. In an embodiment, the processors 602 may be the same as or similar to the processors 102 of FIG. 1. Also, the interconnection 604 may be the same as or similar to the interconnections 104 and/or 112 discussed with reference to FIGS. 1-2. The processors 602 may include any type of a processor such as a general purpose processor, a network processor (e.g., a processor that processes data communicated over a computer network), or another processor, including a reduced instruction set computer (RISC) processor or a complex instruction set computer (CISC) processor. Moreover, the processors 602 may have a single or multiple core design, e.g., including one or more processor cores (106) such as discussed with reference to FIG. 1. The processors 602 with a multiple core design may integrate different types of processor cores on the same integrated circuit (IC) die. Also, the processors 602 with a multiple core design may be implemented as symmetrical or asymmetrical multiprocessors.

As shown in FIG. 6, a chipset 606 may communicate with the interconnection 604. The chipset 606 may include a memory control hub (MCH) 608. The MCH 608 may include a memory controller 610 that communicates with the memory 114. The memory 114 may store data, e.g., including sequences of instructions that are executed by the processors 602, or any other device in communication with the computing system 600. As shown in FIG. 6, the memory 114 may include the page table 116 as discussed with reference to FIGS. 1-5. In one embodiment of the invention, the memory 114 may include one or more volatile storage (or memory) devices such as random access memory (RAM), dynamic RAM (DRAM), synchronous DRAM (SDRAM), static RAM (SRAM), or other volatile memory devices. Nonvolatile memory may also be used such as a hard disk. Additional devices may communicate via the interconnection 604, such as multiple processors and/or multiple system memories.

The MCH 608 may additionally include a graphics interface 614 in communication with a graphics accelerator 616. In one embodiment, the graphics interface 614 may communicate with the graphics accelerator 616 via an accelerated graphics port (AGP). In an embodiment of the invention, a display (such as a flat panel display) may communicate with the graphics interface 614 through, for example, a signal converter that translates a digital representation of an image stored in a storage device such as video memory or system memory into display signals that are interpreted and displayed by the display. In various embodiments, the display signals produced by the display device may pass through various control devices before being interpreted by and subsequently displayed on the display.

Furthermore, a hub interface 618 may enable communication between the MCH 608 and an input/output (I/O) control hub (ICH) 620. The ICH 620 may provide an interface to I/O devices in communication with the computing system 600. The ICH 620 may communicate with a bus 622 through a peripheral bridge (or controller) 624, such as a peripheral component interconnect (PCI) bridge or a universal serial bus (USB) controller. The bridge 624 may provide a data path between the processor 602 and peripheral devices. Other types of topologies may be utilized. Also, multiple buses may communicate with the ICH 6 20, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), or digital data support interfaces (e.g., digital video interface (DVI)).

The bus 622 may communicate with an audio device 626, one or more disk drive(s) 628, and a network adapter 630. The network adapter 630 may communicate with a computer network 631, e.g., enabling various components of the system 600 to send and/or receive data over the network 631. Other devices may communicate through the bus 622. Also, various components (such as the network adapter 630) may communicate with the MCH 608 in some embodiments of the invention. In addition, the processor 602 and the MCH 608 may be combined to form a single chip. Furthermore, the graphics accelerator 616 may be included within the MCH 608 in other embodiments of the invention.

In an embodiment, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media for storing electronic data (e.g., including instructions).

Figure 7:
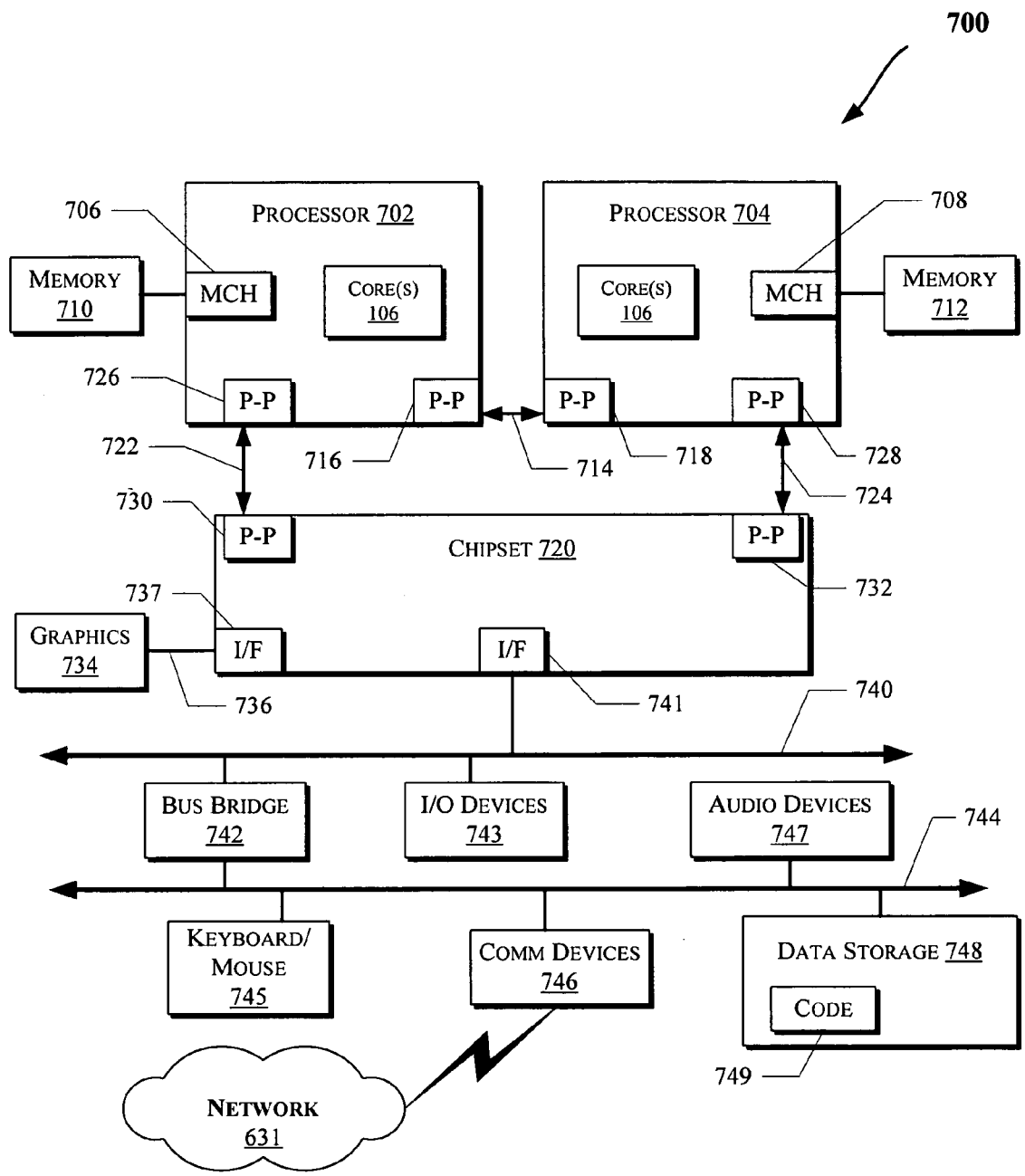

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 114 of FIGS. 1, 2, and 6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

At least one embodiment of the invention may be provided within the processors 702 and 704. For example, one or more of the cores 106 of FIG. 1 or 2 may be located within the processors 702 and 704. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may communicate with a bus 740 using a PtP interface circuit 741. The bus 740 may have one or more devices that communicate with it, such as a bus bridge 742 and I/O devices 743. Via a bus 744, the bus bridge 743 may communicate with other devices such as a keyboard/mouse 745, communication devices 746 (such as modems, network interface devices (e.g., the network adapter 630 of FIG. 6), or other communication devices that may communicate with the computer network 631), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:
1. A processor comprising:
   logic configured to cause a software transactional memory access corresponding to a thread to be performed after a preceding hardware transactional memory access corresponding to the thread fails to be performed;

a transaction descriptor register configured to store a value corresponding to the software transactional memory access; and a memory configured to store one or more ownership flag bits to identify an ownership status of a corresponding memory entry, wherein the one or more ownership flag bits contains a value copied from the value stored at the transaction descriptor register, and wherein the hardware transactional memory access is to be aborted in response to a determination-that the ownership flag indicates a valid ownership status.

2. The processor of claim 1, wherein the logic causes the software transactional memory access and the hardware transactional memory access to be executed speculatively.

3. The processor of claim 1, wherein the processor aborts the hardware transactional memory access when a conflict with a different instruction occurs.

4. The processor of claim 3, further comprising at least one processor core to execute the different instruction.

5. The processor of claim 3, wherein the different instruction is an instruction to request ownership for a same portion of data that is to be accessed by the hardware transactional memory.

6. The processor of claim 1, further comprising a memory configured to store information corresponding to at least one of a first instruction corresponding to the hardware transactional memory access and a second instruction corresponding to the software transactional memory access, wherein the processor updates the stored information when at least one of the first and second instructions commits.

7. The processor of claim 1, further comprising a memory configured to store data, wherein the hardware transactional memory access and the software transactional memory access perform a same operation on the data stored in the memory.

8. The processor of claim 1, the memory is configured to store information corresponding to at least one of the hardware transactional memory access and the software transactional memory access, wherein the stored information comprises a virtual address, a physical address and an ownership flag.

9. The processor of claim 8, wherein the memory comprises a content addressable memory.

10. The processor of claim 8, wherein the memory comprises a data translation look-a-side buffer.

11. The processor of claim 1, further comprising a memory configured to store a page table, wherein the page table stores data comprising one or more of a virtual address tag, a physical address tag, and physical address data.

12. The processor of claim 11, further comprising a register configured to store a page table limit pointer that points to a last entry of the page table.

13. The processor of claim 1, further comprising a register configured to store a descriptor corresponding to the software transactional memory access.

14. The processor of claim 1, wherein the hardware transactional memory access fails to be performed due to a hardware overflow.

15. The processor of claim 1, further comprising a plurality of cores.

16. The processor of claim 1, wherein the memory is to store a speculation flag to indicate that an entry corresponding to the speculation flag is to be accessed speculatively in response to an initiation of the software transactional memory or the hardware transactional memory, wherein the speculation flag is to be updated, to indicate that the entry corresponding to the speculation flag is not to be accessed speculatively, in response to commitment of one of the software transactional memory or the hardware transactional memory.

17. A method comprising:
executing a first instruction of a thread, the first instruction corresponding to a hardware transactional memory access;

executing a second instruction of the thread when the first instruction fails to commit, the second instruction corresponding to a software transactional memory access;

storing a value corresponding to the second instruction in a transaction descriptor register; and storing one or more ownership flag bits to identify an ownership status of a corresponding memory entry, wherein the one or more ownership flag bits contains a value copied from the value stored at the transaction descriptor register, and wherein the hardware transactional memory access is to be aborted in response to a determination that the ownership flag indicates a valid ownership status.

18. The method of claim 17, further comprising executing both of the first instruction and the second instruction speculatively.

19. The method of claim 17, wherein the first instruction and the second instruction perform a same operation on data stored in a memory.

20. The method of claim 17, further comprising aborting the first instruction when a conflict with a different instruction occurs.

21. The method of claim 17, wherein the first instruction fails to commit due to a hardware overflow.

22. The method of claim 17, further comprising storing a speculation flag to indicate that an entry corresponding to the speculation flag is to be accessed speculatively in response to an initiation of the software transactional memory or the hardware transactional memory, wherein the speculation flag is to be updated, to indicate that the entry corresponding to the speculation flag is not to be accessed speculatively, in response to commitment of one of the software transactional memory or the hardware transactional memory.

23. The method of claim 17, further comprising storing ownership information corresponding to the second instruction in a data translation look-a-side buffer.

24. A system comprising:
a memory configured to store a first instruction corresponding to a hardware transactional memory operation and a second instruction corresponding to a software transactional memory operation;

a processor configured to fetch the second instruction if performing the hardware transactional memory operation will cause an overflow condition within a cache memory;

a transaction descriptor register configured to store a value corresponding to the second instruction; and a storage unit configured to store one or more ownership flag bits to identify an ownership status of a corresponding memory entry, wherein the one or more ownership flag bits contains a value copied from the value stored at the transaction descriptor register, and wherein the hardware transactional memory access is to be aborted in response to a determination that the ownership flag indicates a valid ownership status.

25. The system of claim 24, wherein the memory comprises a page table configured to store information corresponding to mapping between virtual and physical addresses.

26. The system of claim 25, wherein the page table stores data comprising one or more of a virtual address tag, a physical address tag, and physical address data.

27. The system of claim 25, further comprising a content addressable memory configured to store a portion of the page table.

28. The system of claim 24, further comprising an audio device.

29. The system of claim 24, wherein the storage unit is to store a speculation flag to indicate that an entry corresponding to the speculation flag is to be accessed speculatively in response to an initiation of the software transactional memory or the hardware transactional memory, wherein the speculation flag is to be updated, to indicate that the entry corresponding to the speculation flag is not to be accessed speculatively, in response to commitment of one of the software transactional memory or the hardware transactional memory.

30. A non-transitory computer-readable medium comprising one or more instructions that when executed on a processor configure the processor to:
   execute a first instruction of a thread, the first instruction corresponding to a hardware transactional memory access;
   execute a second instruction of the thread when the first instruction fails to commit, the second instruction corresponding to a software transactional memory access;
   storing a value corresponding to the second instruction in a transaction descriptor register; and
   store one or more ownership flag bits to identify an ownership status of a corresponding memory entry, wherein the one or more ownership flag bits contains a value copied from the value stored at the transaction descriptor register, and wherein the hardware transactional memory access is to be aborted in response to a determination that the ownership flag indicates a valid ownership status.

31. The non-transitory computer-readable medium of claim 30, further comprising one or more instructions that configure the processor to execute the first instruction and the second instruction speculatively.

32. The non-transitory computer-readable medium of claim 30, further comprising one or more instructions that configure the processor to abort the first instruction if the ownership information comprises a valid ownership flag.

33. The non-transitory computer-readable medium of claim 30, further comprising one or more instructions that configure the processor to fetch the second instruction if the first instruction fails to commit due to a hardware overflow.

34. The non-transitory computer-readable medium of claim 30, further comprising one or more instructions that configure the processor to store a speculation flag to indicate that an entry corresponding to the speculation flag is to be accessed speculatively in response to an initiation of the software transactional memory or the hardware transactional memory, wherein the speculation flag is to be updated, to indicate that the entry corresponding to the speculation flag is not to be accessed speculatively, in response to commitment of one of the software transactional memory or the hardware transactional memory.

* * * * *